United States Patent
Luo et al.

(10) Patent No.: US 12,262,668 B2
(45) Date of Patent: Apr. 1, 2025

(54) FAN GROW LIGHT

(71) Applicant: SINOWELL (SHANGHAI) CO., LTD., Shanghai (CN)

(72) Inventors: Jia Luo, Shanghai (CN); Yunfei Duan, Shanghai (CN); Liang Zhou, Shanghai (CN)

(73) Assignee: SINOWELL (SHANGHAI) CO., LTD., Shanghai (CN)

( * ) Notice: Subject to any disclaimer, the term of this patent is extended or adjusted under 35 U.S.C. 154(b) by 422 days.

(21) Appl. No.: 17/663,880

(22) Filed: May 18, 2022

(65) Prior Publication Data

US 2023/0165196 A1   Jun. 1, 2023

Related U.S. Application Data

(63) Continuation-in-part of application No. PCT/CN2022/073417, filed on Jan. 24, 2022.

(30) Foreign Application Priority Data

Oct. 21, 2021 (CN) .......................... 202111226176.5
Oct. 21, 2021 (CN) .......................... 202122536368.8

(51) Int. Cl.
| | | |
|---|---|---|
| *A01G 7/04* | (2006.01) | |
| *A01G 9/24* | (2006.01) | |
| *F04D 25/10* | (2006.01) | |
| *F04D 29/42* | (2006.01) | |
| *F04D 29/70* | (2006.01) | |
| *F21V 33/00* | (2006.01) | |

(52) U.S. Cl.
CPC .......... *A01G 9/249* (2019.05); *F04D 25/105* (2013.01); *F04D 29/4226* (2013.01); *F04D 29/703* (2013.01); *F21V 33/0096* (2013.01)

(58) Field of Classification Search
CPC .............................. A01G 9/249; A01G 7/045
See application file for complete search history.

(56) References Cited

U.S. PATENT DOCUMENTS

| | | | |
|---|---|---|---|
| D1,024,398 S  * | 4/2024 | Luo ................................ | D26/59 |
| 2010/0300648 A1 | 12/2010 | Grantham | |
| 2016/0363341 A1* | 12/2016 | Arens ....................... | F24F 11/77 |
| 2020/0037414 A1 | 1/2020 | Deng | |
| 2024/0196812 A1* | 6/2024 | Luo ......................... | F21V 21/00 |

(Continued)

FOREIGN PATENT DOCUMENTS

| | | | |
|---|---|---|---|
| CN | 204404123 | | 6/2015 |
| CN | 206615038 | U  * | 11/2017 |
| CN | 109424890 | | 3/2019 |

(Continued)

OTHER PUBLICATIONS

International Search Report dated Jul. 21, 2022 from corresponding PCT Application No. PCT/CN2022/073417.

*Primary Examiner* — Joseph L Williams
(74) *Attorney, Agent, or Firm* — ArentFox Schiff LLP

(57) ABSTRACT

Provided is a fan grow light. The fan grow light is configured to be mounted in a tent. The fan grow light includes a lamp board assembly and a fan assembly disposed on the lamp board assembly. The fan assembly is able to promote air circulation in the tent. The fan grow light can promote air circulation in the tent, enable plants to breathe better, inhibit molds, and promote plant growth.

18 Claims, 14 Drawing Sheets

(56) References Cited

U.S. PATENT DOCUMENTS

2024/0196813 A1* 6/2024 Luo .................... A01G 9/24

FOREIGN PATENT DOCUMENTS

| CN | 110848160 | | 2/2020 |
|----|-----------|---|---------|
| CN | 110966234 | | 4/2020 |
| CN | 211557853 U | * | 9/2020 |
| CN | 211861191 U | * | 11/2020 |
| IN | 213368841 | | 6/2021 |
| TW | 566466 | | 12/2003 |

* cited by examiner

FAN GROW LIGHT

CROSS-REFERENCE TO RELATED APPLICATION

This is a continuation-in-part of International Patent Application No. PCT/CN2022/073417, filed on Jan. 24, 2022, which claims priority to Chinese Patent Applications No. 202111226176.5 and No. 202122536368.8 filed with the China National Intellectual Property Administration (CNIPA) on Oct. 21, 2021, the disclosure of which are incorporated herein by reference in their entireties.

TECHNICAL FIELD

The present disclosure relates to the technical field of grow lights, for example, a fan grow light.

BACKGROUND

A grow light is a lamp for plants. According to the principle that plants need sunlight for photosynthesis, grow lights can supplement light to plants or completely replace sunlight. Light sources suitable for supplementing light to plants include, for example, high-pressure sodium lamps, metal halide lamps, ceramic metal halide lamps, microwave sulfur lamps, plasma lamps, fluorescent lamps, electrodeless lamps, tri-phosphor rare-earth supplement lamps, and light-emitting diode (LED) grow lights. Sodium lamps for supplementing light to plants, metal halide lamps, and LED grow lights are most commonly used, and other types of lamps are rarely used or very expensive. According to application tests, grow lights are very suitable for plant growth, flowering and fruiting. In general, indoor plants and flowers grow worse and worse over time due to a lack of natural light. In this case, the plants can be irradiated by a grow light with a spectrum require d by the plants to promote the growth of the plants, prolong the flowering period, and improve the quality of the flowers. When the high-efficiency light source system is applied to a facility such as a greenhouse, the problem of the decrease in the taste of greenhouse vegetables such as tomatoes and cucumbers due to the lack of sunlight can be solved, and solanaceous vegetables in the winter greenhouse can be marketed in advance around the Spring Festival, thereby achieving the purpose of anti-seasonal cultivation.

However, in a planting facility such as a greenhouse and a planting tent, plants grow slowly and have a poor growth state due to insufficient air circulation.

SUMMARY

The present disclosure provides a fan grow light.

The present disclosure provides a fan grow light. The fan grow light is configured to be mounted in a planting tent. The fan grow light includes a lamp board assembly and a fan assembly disposed on the lamp board assembly. The fan assembly is able to promote air circulation in the tent.

Figure 1:
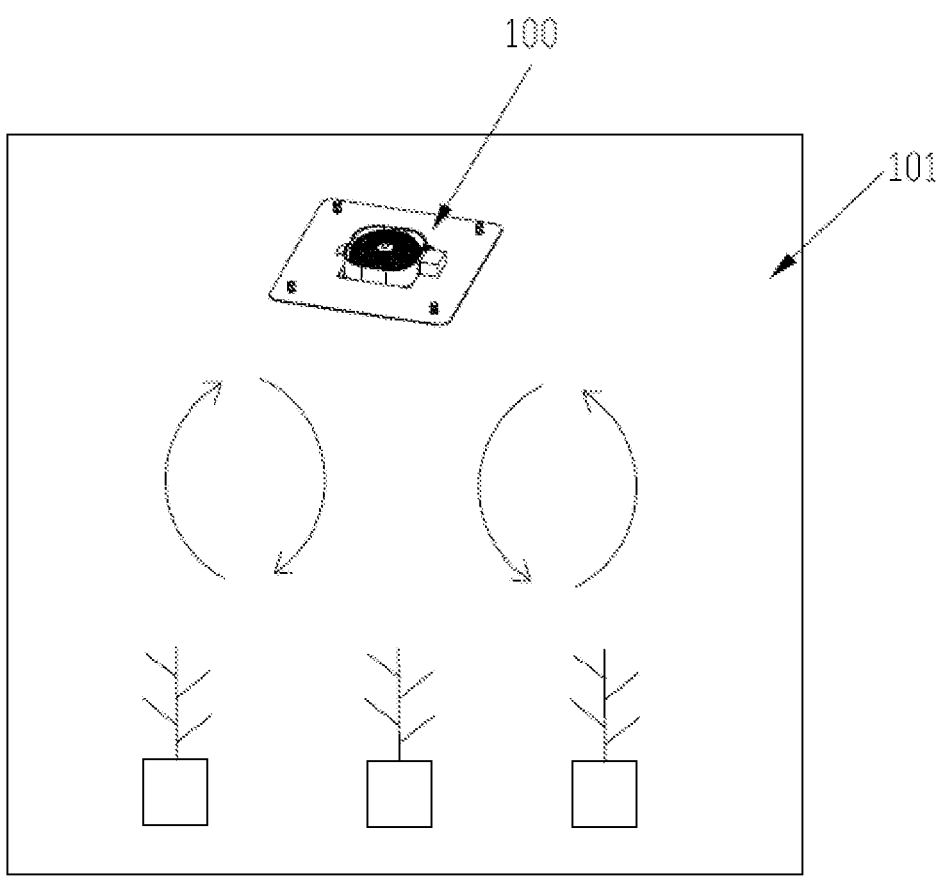
FIG. 1 is a view of a fan grow light mounted in a tent according to embodiments of the present disclosure.

REFERENCE LIST 101 tent
102 first axis
103 second axis
104 third axis
105 fifth axis
100 fan grow light
110 lamp board assembly
111 mounting hole
112 hinge shaft
120 fan assembly
121 fan assembly main body
122 fan assembly connection piece
1221 first side
1222 second side
1223 third side
1224 fourth side
123 cross-flow fan
124 air guide piece 125 protective rotating blade
130 first servo
140 second servo
150 hinge holder
151 installation plate
152 hinge arm
160 suspension structure
161 hanging hole
106 hanging rod
1211 air diffusion blade
12111 concentric type unit
12112 connection rib
12113 rib

DETAILED DESCRIPTION

The present disclosure is further described in detail hereinafter in conjunction with the drawings and embodiments. It is to be understood that the embodiments described herein are intended to illustrate and not to limit the present disclosure. Additionally, it is to be noted that to facilitate description, only part, not all, of structures related to the present disclosure are illustrated in the drawings.

In the description of embodiments of the present disclosure, unless otherwise expressly specified and limited, the term "connected to each other", "connected" or "fixed" is to be construed in a broad sense, for example, as fixedly connected, detachably connected, or integrated; mechanically connected or electrically connected; directly connected to each other or indirectly connected to each other via an intermediary; or internally connected between two elements or interaction relations between two elements. For those of ordinary skill in the art, meanings of the preceding terms in embodiments of the present disclosure may be construed according to specific circumstances.

In embodiments of the present disclosure, unless otherwise expressly specified and limited, when a first feature is described as "on" or "below" a second feature, the first feature and the second feature may be in direct contact, or be in contact via another feature between the two features instead of being in direct contact. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

In the description of the embodiments, it is to be noted that orientations or position relations indicated by terms such as "above", "below", "left" and "right" are based on the drawings. These orientations or position relations are intended only to facilitate the description and simplify an operation and not to indicate or imply that a device or element referred to must have such particular orientations or must be configured or operated in such particular orientations. Thus, these orientations or position relations are not to be construed as limiting the present disclosure. In addition, the terms "first" and "second" are used only to distinguish between descriptions and have no special meaning.

The solutions of the present disclosure are further described hereinafter through embodiments in conjunction with the drawings.

Figure 2:
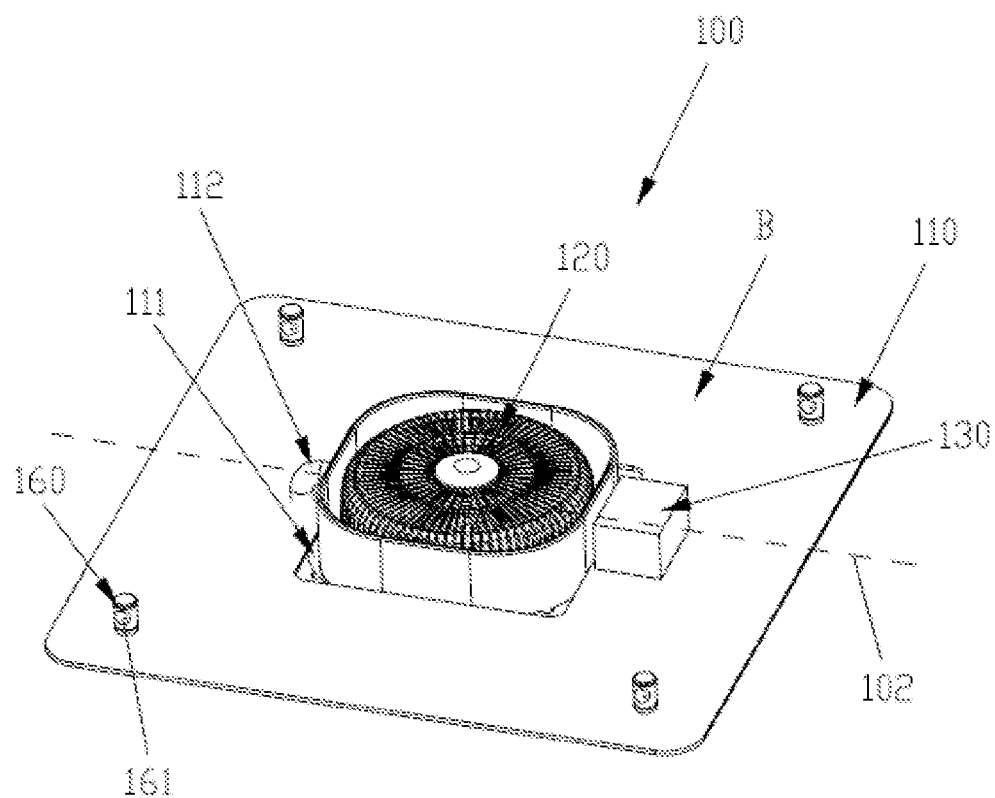
FIG. 2 is a view illustrating the structure of a fan grow light according to a first embodiment of the present disclosure.

Embodiments of the present disclosure provide a fan grow light. As shown in FIG. 1, the fan grow light provided in embodiments of the present disclosure is mainly configured to be mounted in a planting tent (or a tent) 101. As shown in FIG. 2, the fan grow light 100 includes a lamp board assembly 110 and a fan assembly 120. The lamp board assembly 110 is provided with lamp beads. The lamp beads emit light after being energized so that functions of the grow light are implemented. The fan assembly 120 is disposed on the lamp board assembly 100. The fan assembly 120 is able to promote air circulation in the tent 101. Due to the relatively closed space in the tent 101, the air is not circulated, which is detrimental to plant growth. In embodiments of the present disclosure, the fan assembly 120 is integrated on the grow light. The fan grow light 100 integrated with the fan assembly 120 is mounted in the tent 101 so that the fan grow light 100 in embodiments of the present disclosure can promote air circulation in the tent 101, enabling plants in the tent 101 to breathe better, inhibiting molds, and thus promoting plant growth.

Figure 3:
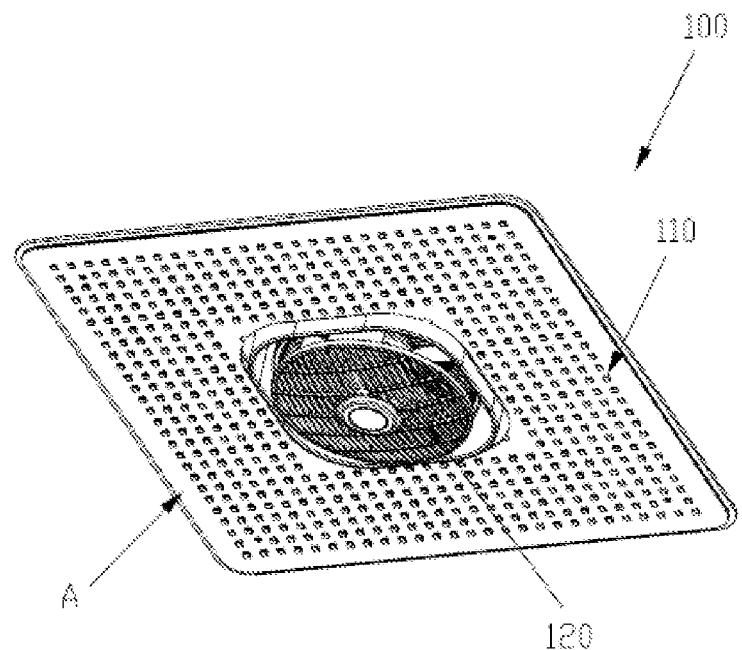
FIG. 3 is a view illustrating the structure shown in FIG. 2 and taken from another perspective.

Referring to FIG. 1, the grow light is generally mounted on the top of the tent 101. As shown in FIG. 3, the light-emitting surface A of the lamp board assembly 110 faces downward and emits light towards plants below the grow light. Accordingly, preferably, referring to FIGS. 1 to 3, the air outlet surface of the fan assembly 120 also faces downward and blows towards the plants, which better promotes air motion above the plants. It is to be understood that in other embodiments, the air outlet surface of the fan assembly 120 may also face toward another direction as long as the air motion in the tent 101 can be promoted. Additionally, the air outlet surface of the fan assembly 120 facing downward includes facing downward vertically and facing downward obliquely. That is, the air outlet surface of the fan assembly 120 may face downward in the vertical direction or may face downward at a certain angle with the vertical direction, which is not limited here.

In one embodiment, as shown in FIG. 2, the fan assembly 120 is disposed in the center of the lamp board assembly 110. In other embodiments, the fan assembly 120 may also be disposed at another position on the lamp board assembly 110, for example, the edge of the lamp board assembly 110. In an embodiment, more than one fan assembly 120 may be provided. In embodiments of the present disclosure, the fan assembly 120 can be disposed in the center of the lamp board assembly 110 to facilitate the design and installation of the entire structure.

As shown in FIG. 2, the center of the lamp board assembly 110 is provided with a mounting hole 111. In other embodiments, the mounting hole 111 may also be disposed at another position of the lamp board assembly 110. The fan assembly 120 is disposed in the mounting hole 111. In the embodiment shown in FIG. 2, the mounting hole 111 is a through hole. In other embodiments, the mounting hole 111 may also be a blind hole. The arrangement in which the mounting hole 111 is designed as a through hole facilitates the installation of the fan assembly 120.

In order to facilitate the adjustment of the angle of the fan assembly 120, the fan assembly 120 may be hinged to the lamp board assembly 110 so that the fan assembly 120 is rotatable on the lamp board assembly 110, thereby implementing the adjustment of the air outlet angle of the fan assembly 120. In this way, the fan assembly 120 can be rotated to any angle to blow air as needed, meeting the needs of air circulation in the tent 101.

The angle of the fan assembly 120 may be adjusted manually; that is, the angle of the fan assembly 120 may be adjusted by directly rotating the fan assembly 120. Alternatively, the angle of the fan assembly 120 may be adjusted automatically through a driving apparatus. Accordingly, referring to FIG. 1, in one embodiment, the fan grow light 100 further includes a first servo 130. The first servo 130 is disposed on the lamp board assembly 110. The fan assembly 120 is connected to an output end of the first servo 130 so that the first servo 130 drives the fan assembly 120 to rotate. As shown in FIG. 2, the main body of the first servo 130 is mounted on the backlight surface B of the lamp board assembly 110 and is mounted on one side of the mounting hole 111. The output shaft of the first servo 130 extends into the mounting hole 111 to be connected to the fan assembly 120 located in the mounting hole 111. The first servo 130 drives the fan assembly 120 to rotate around a first axis 102.

In the embodiment shown in FIG. 2, one first servo 130 is provided. The first servo 130 is disposed on one end of the fan assembly 120. One end of the fan assembly 120 is connected to the output shaft of the first servo 130. Another end of the fan assembly 120 is hinged to the lamp board assembly 110 through a hinge shaft 112. In other embodiments, two first servos 130 may be provided, and each of two ends of the fan assembly 120 is connected to one first servo 130. The arrangement of only one servo 130 can reduce the cost and completely meet the rotation needs of the fan assembly 120.

Figure 4:
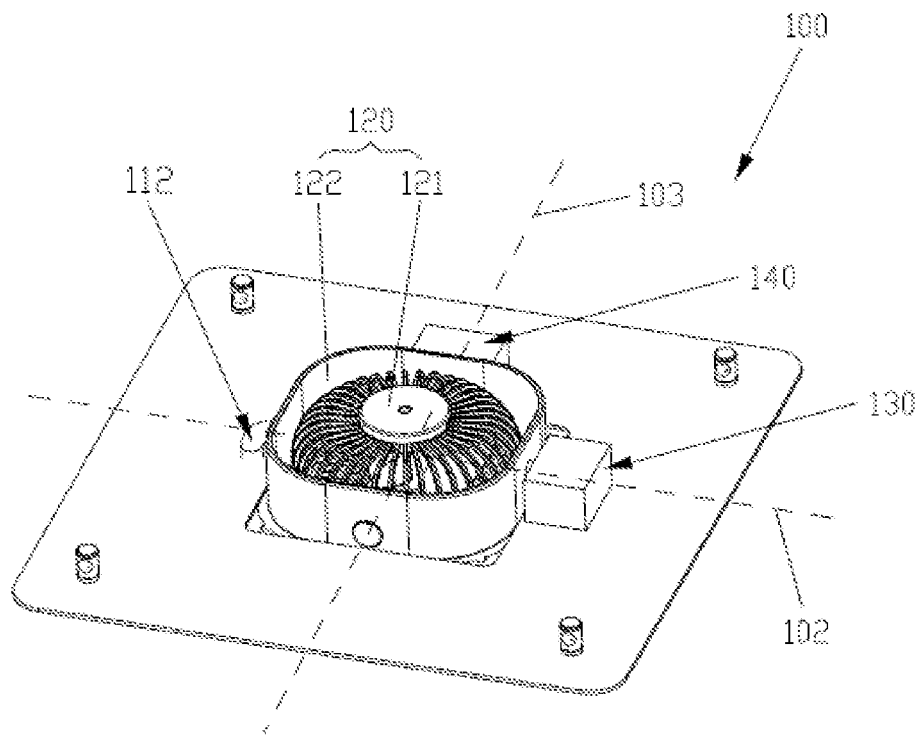
FIG. 4 is a view illustrating the structure of a fan grow light according to the second embodiment of the present disclosure.
Figure 5:
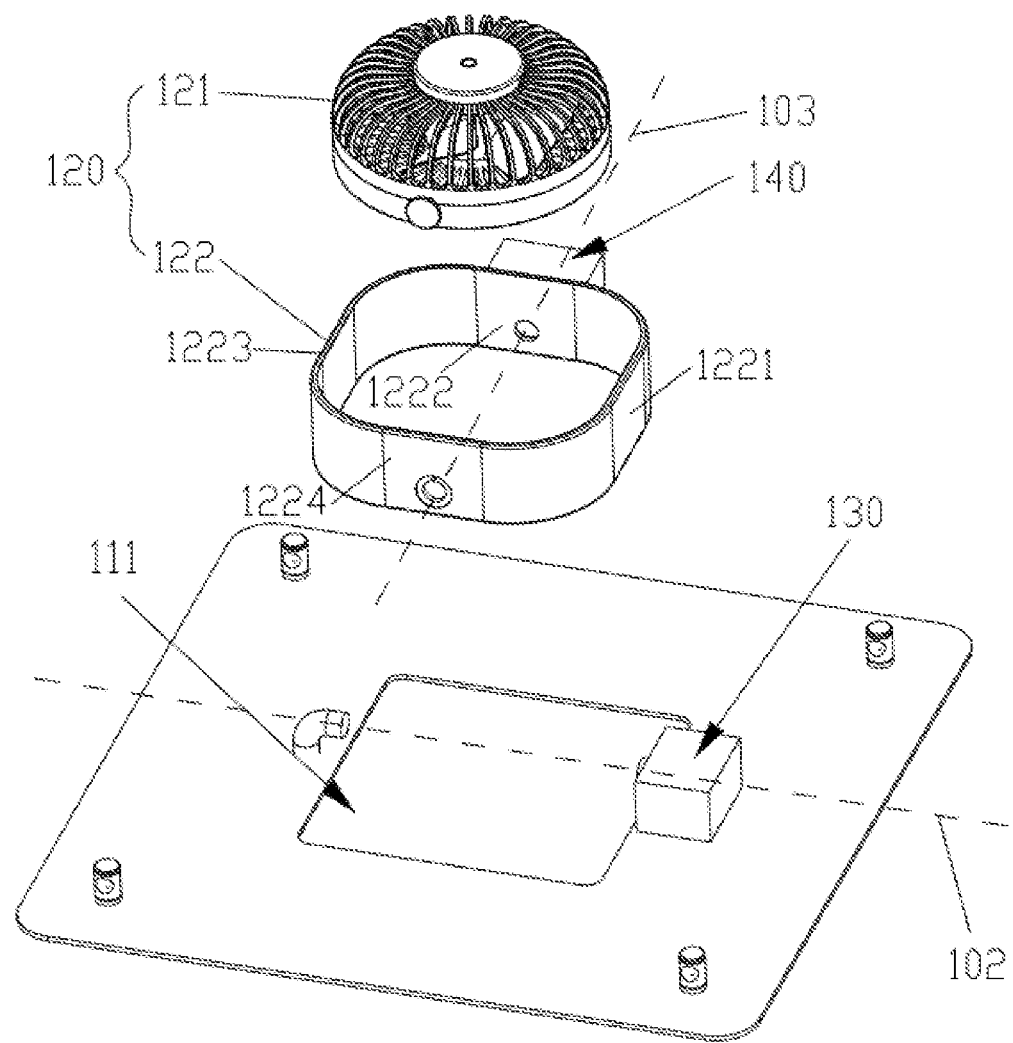
FIG. 5 is an exploded view illustrating the structure shown in FIG. 4.

In the embodiment shown in FIG. 2, the adjustment angle of the fan assembly 120 is limited since the fan assembly 120 is rotatable only around the first axis 102. In order to adjust the fan assembly 120 at a larger angle, as shown in FIG. 4, in another embodiment, the fan grow light 100 further includes a second servo 140. Referring to FIGS. 4 and 5, the fan assembly 120 includes a fan assembly main body 121 and a fan assembly connection piece 122. The fan assembly connection piece 122 is connected to the output end of the first servo 130 so that the first servo 130 drives the fan assembly connection piece 122 to rotate around the first axis 102. The second servo 140 is disposed on the fan assembly connection piece 122 and the output end of the second servo 140 is connected to the fan assembly main body 121 so that the second servo 140 drives the fan assembly main body 121 to rotate around a second axis 103. The second axis 103 is perpendicular to the first axis 102. In this case, the fan assembly main body 121 can both rotate around the first axis 102 along with the fan assembly connection piece 122 under the driving of the first servo 130 and rotate around the second axis 103 alone under the driving of the second servo 140. Accordingly, the fan assembly main body 121 can be adjusted in all directions and at multiple angles so that the air outlet direction of the fan assembly main body 121 can be adjusted arbitrarily.

In one embodiment, as shown in FIGS. 4 and 5, the fan assembly connection piece 122 is in the shape of an outer frame, and the fan assembly main body 121 is disposed in the outer frame. In other embodiments, the fan assembly connection piece 122 may also be in another shape and be another structure, for example, a connection bracket or a connection plate, which is not limited here.

In one embodiment, as shown in FIG. 5, the fan assembly connection piece 122 is in the shape of a rectangular frame and includes four sides that are a first side 1221, a second side 1222, a third side 1223, and a fourth side 1224 successively. The fan assembly main body 121 is disposed in the fan assembly connection piece 122. The first side 1221 of the fan assembly connection piece 122 is connected to the output shaft of the first servo 130. The second side 1222 of the fan assembly connection piece 122 is provided with the second servo 140. The first side 1221 is adjacent to the second side 1222. As shown in FIG. 5, one end of the fan assembly main body 121 is connected to the output shaft of the second servo 140, and another end of the fan assembly main body 121 is hinged to the fourth side 1224 of the fan assembly connection piece 122. In this case, the two ends of the fan assembly main body 121 can be supported, improving the stability when the fan assembly main body 121 rotates. The first side 1221 of the fan assembly connection piece 122 is connected to the first servo 130; the third side 1223 of the fan assembly connection piece 122 is hinged to the lamp board assembly 110 through the hinge shaft 112; and the two sides of the fan assembly connection piece 122 are supported. Accordingly, the fan assembly connection piece 122 can rotate more stably.

Figure 6:
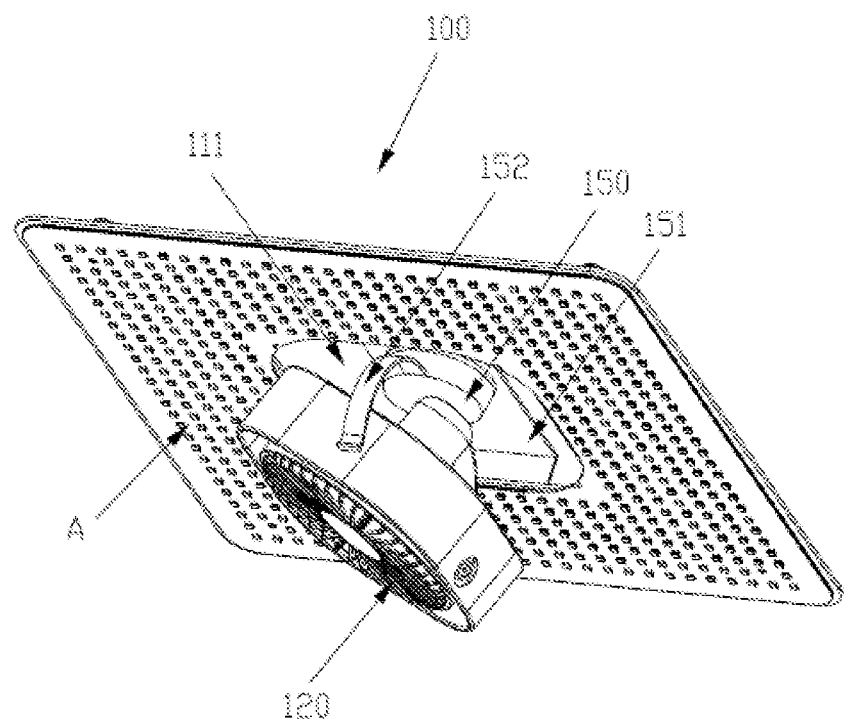
FIG. 6 is a view illustrating the structure of a fan grow light according to a third embodiment of the present disclosure.
Figure 7:
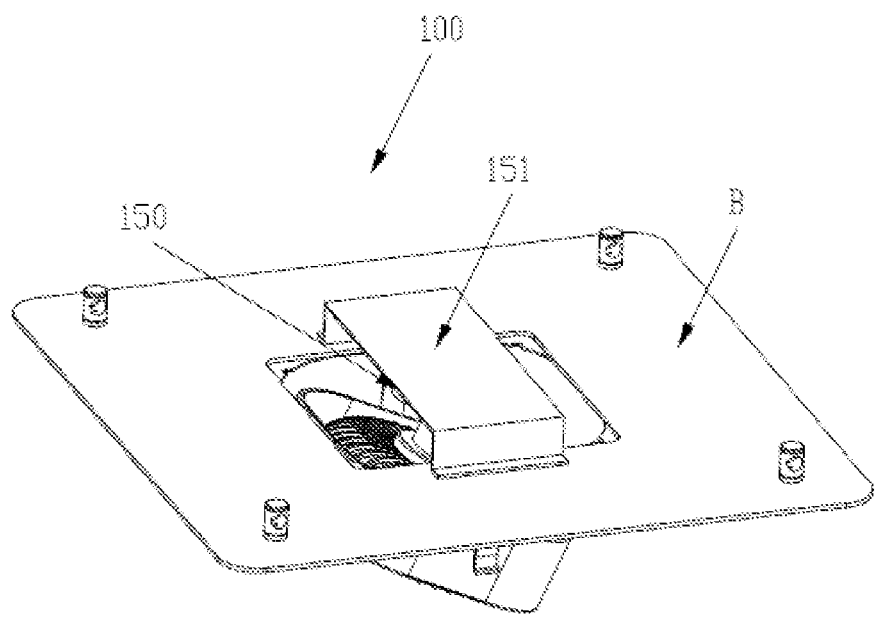
FIG. 7 is a view illustrating the structure shown in FIG. 6 and taken from another perspective.
Figure 8:
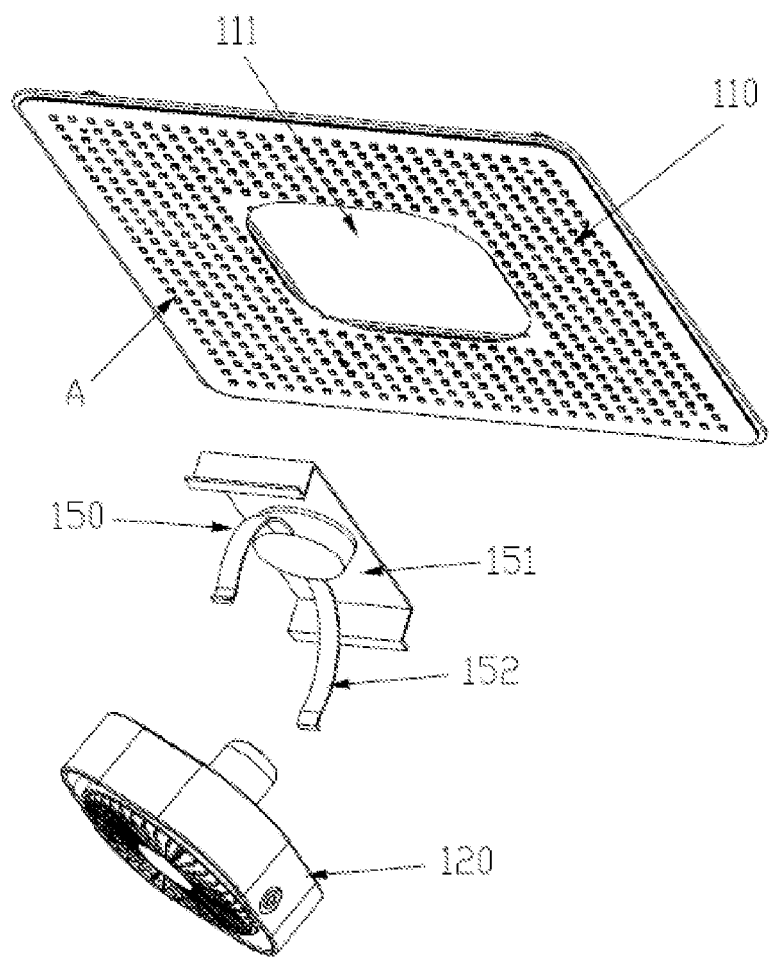
FIG. 8 is an exploded view illustrating the structure shown in FIG. 6.

Referring to FIGS. 6 to 8, in another embodiment, the fan grow light 100 further includes a hinge holder 150. The hinge holder 150 is disposed on the lamp board assembly 110. The top end of the hinge holder 150 is connected to the lamp board assembly 110. The fan assembly 120 is hinged to the bottom end of the hinge holder 150. With the arrangement of the hinge holder 150, the fan assembly 120 is enabled to extend below the lamp board assembly 110. No matter what angle the fan assembly 120 is adjusted to, the lamp board assembly 110 does not block the fan assembly 120 or interfere with the air blown by the fan assembly 120.

In embodiments of the present disclosure, no specific limitation is imposed on the structure of the hinge holder 150. In one embodiment, as shown in FIGS. 6 to 8, the hinge holder 150 includes an installation plate 151 and a hinge arm 152. The installation plate 151 is connected to the lamp board assembly 110 and secured to the lamp board assembly 110. The hinge arm 152 extends from the installation plate 151 in a direction away from the installation plate 151. For example, the hinge arm 152 extends downward from the lamp board assembly 110. The fan assembly 120 is hinged to the hinge arm 152. The hinge arm 152 extends downward from the lamp board assembly 110 so that the fan assembly 120 is located below the lamp board assembly 110.

In one embodiment, two hinge arms 152 are provided. The two hinge arms 152 are disposed opposite to each other and are hinged to two ends of the fan assembly 120 respectively. The two ends of the fan assembly 120 are supported by the two hinge arms 152 so that the fan assembly 120 is mounted more stably and stays more stable when rotating.

Referring to FIGS. 6 to 8, the center of the lamp board assembly 110 is provided with the mounting hole 111. The mounting hole 111 is a through hole. The installation plate 151 is secured to the backlight surface B of the lamp board assembly 110. The tail end of each hinge arm 152 passes through the mounting hole 111 and extends below the light-emitting surface A of the lamp board assembly 110. The fan assembly 120 is hinged to the tail end of each hinge arm 152. The arrangement in which the installation plate 151 is secured to the backlight surface B of the lamp board assembly 110 avoids the provision of a mounting hole on the light-emitting surface A of the lamp board assembly 110 to secure the installation plate 151, thereby increasing the area of the light-emitting surface A, that is, increasing the number of lamp beads on the light-emitting surface A, and enhancing light-emitting efficiency.

Figure 9:
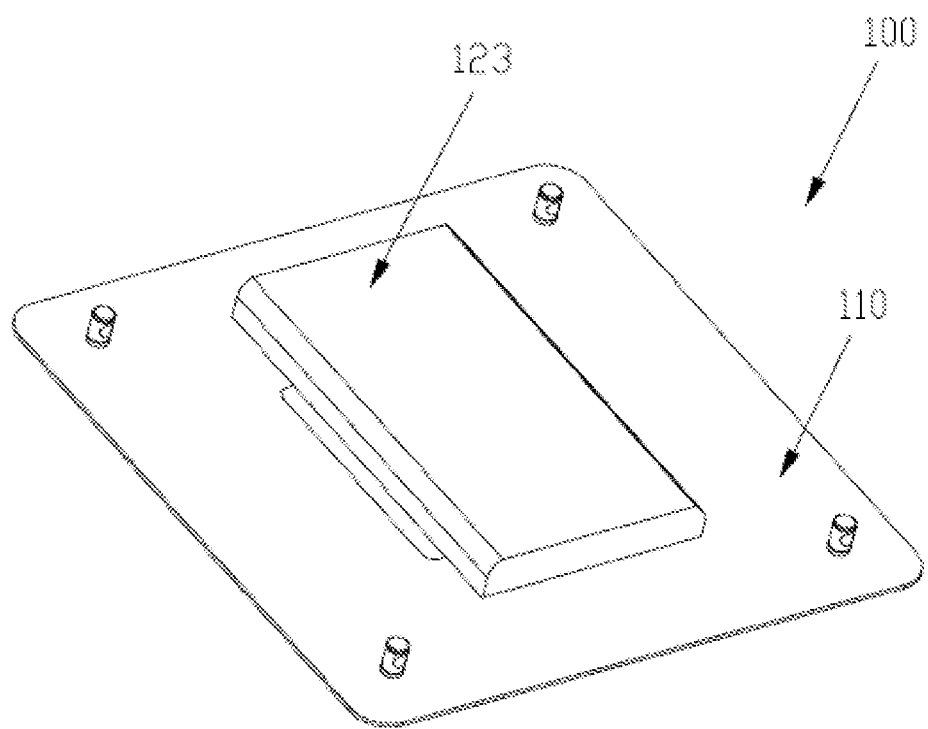
FIG. 9 is a view illustrating the structure of a fan grow light according to a fourth embodiment of the present disclosure.
Figure 10:
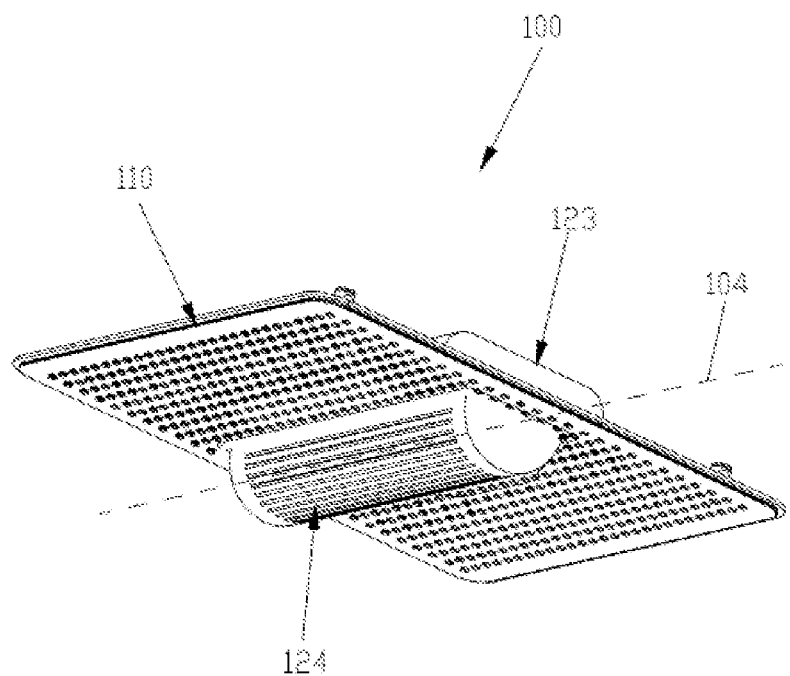
FIG. 10 is a view illustrating the structure shown in FIG. 9 and taken from another perspective.

Referring to FIGS. 9 and 10, in one embodiment, the fan assembly 120 includes a cross-flow fan 123, an air guide piece 124, and a third servo (not shown). The air guide piece 124 is disposed on the air outlet surface of the cross-flow fan 123 and is connected to the third servo. The third servo is able to drive the air guide piece 124 to rotate around a third axis 104. The third axis 104 is parallel to the axial direction of the cross-flow fan 123. The cross-flow fan 123 is known in the existing art, and thus the structure and principle of the cross-flow fan 123 are not introduced in detail here. The cross-flow fan 123 generates a large air output, which achieves a relatively good effect of promoting air circulation. The air outlet surface of the cross-flow fan 123 is provided with the air guide piece 124 so as to guide the blowing direction. The air guide piece 124 is rotatable so as to adjust the angle of the air guide piece 124.

Figure 11:
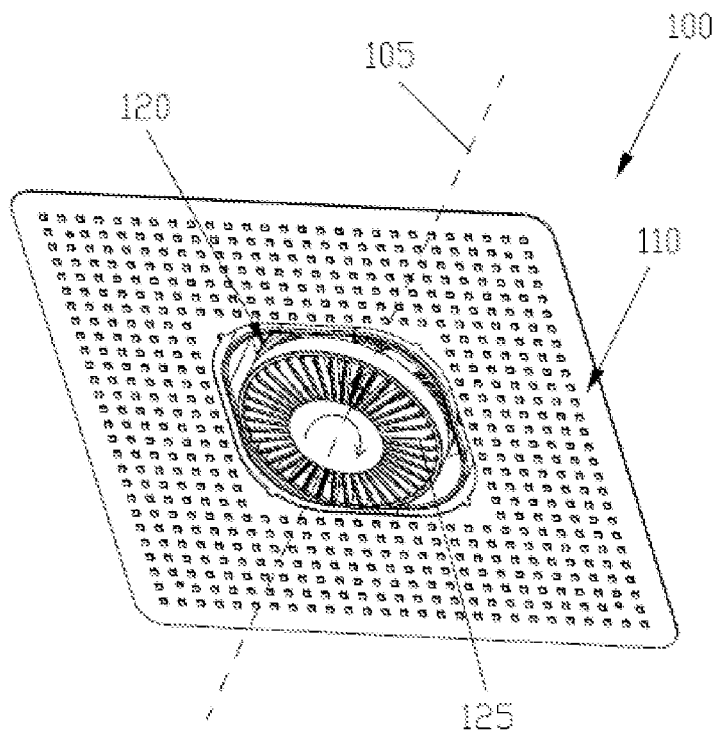
FIG. 11 is a view illustrating the structure of a fan grow light according to a fifth embodiment of the present disclosure.

Referring to FIG. 11, in one embodiment, the front side of the fan assembly 120 is provided with protective rotating blades 125. The protective rotating blades 125 are configured to protect the interior of the fan assembly 120 and prevent an external object from being drawn into the interior of the fan assembly 120. Since the interior of the fan assembly 120 is provided with a main blade, the rotation of the main blade drives the airflow so as to implement functions of the fan. Since the main blade has a faster rotation speed and is sharper, if an external object is drawn into the fan assembly 120, it may be dangerous and the fan may even be damaged. Accordingly, the protective rotating blades 125 are disposed on the front side of the fan assembly 120. The protective rotating blades 125 rotate coaxially with the main blade of the fan assembly 120, that is, rotate around a fourth axis as shown in FIG. 11. The rotation direction may be clockwise as shown in FIG. 11 or may be counterclockwise, which is not limited here. The arrangement of the rotatable protective rotating blades 125 can improve the effect of promoting air motion.

Figure 12:
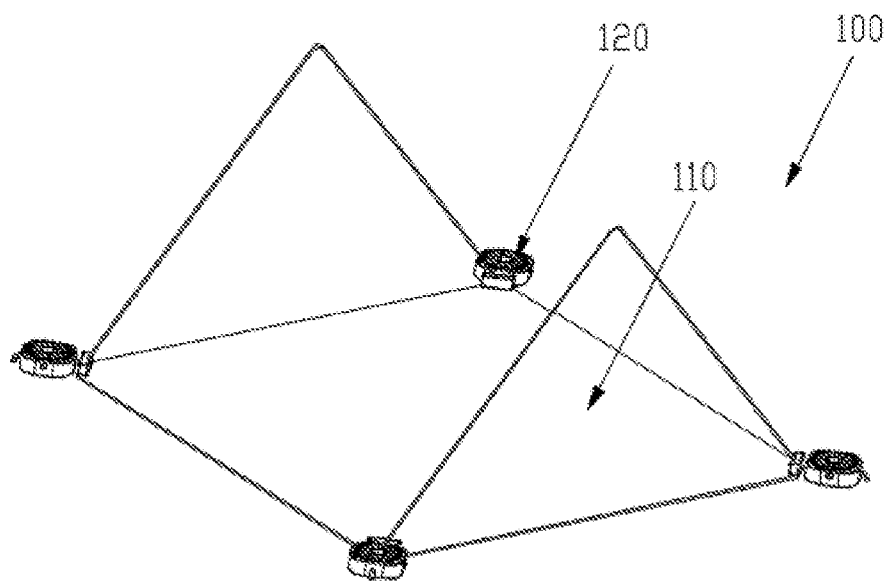
FIG. 12 is a view illustrating the structure of a fan grow light according to a sixth embodiment of the present disclosure.

Referring to FIG. 12, in one embodiment, a plurality of fan assemblies 120 are provided. The fan assemblies 120 are disposed in the circumferential direction of the lamp board assembly 110. With the expansion of tent space, the solution of arranging a plurality of low-power fans or the solution of arranging a single large-power fan may be selected. In the embodiment shown in FIG. 12, the solution of arranging a plurality of low-power fans is used. The fan assemblies 120 are spaced apart around the lamp board assembly 110, improving the effect of promoting air motion.

As mentioned above, the fan grow light 100 in the present disclosure is mounted in the tent 101. In order to facilitate the installation of the fan grow light 100 in the tent 101, as shown in FIG. 2, a plurality of suspension structures 160 are disposed in the circumferential direction of the lamp board assembly 110. Each suspension structure 160 is configured to be connected to a hanging rope or a hanging rod and suspend the fan grow light in the tent 101 through the hanging rope or the hanging rod.

A suspension structure 160 may be a structure including a hanging hook, a hanging rod or a hanging post. Alternatively, a suspension hole is directly disposed on the lamp board assembly 110 as long as the suspension is implemented, which is not limited here. In one embodiment, as shown in FIG. 2, a suspension structure 160 is a hanging post. The hanging post is provided with a hanging hole 161 through which a hanging rope or a hanging rod passes to suspend the fan grow light 100.

As shown in FIG. 2, a plurality of hanging posts may be provided. The hanging posts are spaced apart in the circumferential direction of the lamp board assembly 110 so as to make the forces on all parts of the lamp board assembly 110 more uniform and balanced.

In one embodiment, a heat dissipation piece may be a heat sink.

In one embodiment, an inserting assembly may be a socket or a plug.

Referring to FIGS. 12 to 16, in one embodiment, the fan assembly 120 includes an air diffusion blade 1211 disposed on the air outlet surface of the fan assembly 120 so as to expand the air outlet angle of an airflow blown by the fan assemble 120. That is, the air diffusion blade 1211 enables the air blown by the fan assembly 120 to be diffused outwardly. Accordingly, the air blown by the fan assembly 120 can cover a wider region, improving the effect of air circulation and thus being more beneficial to plant growth.

Figure 17:
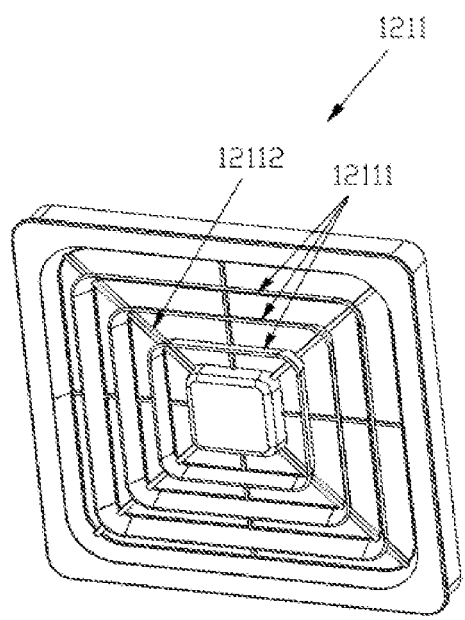
FIG. 17 is a view illustrating the structure of an air diffusion blade according to an embodiment of the present disclosure.
Figure 18:
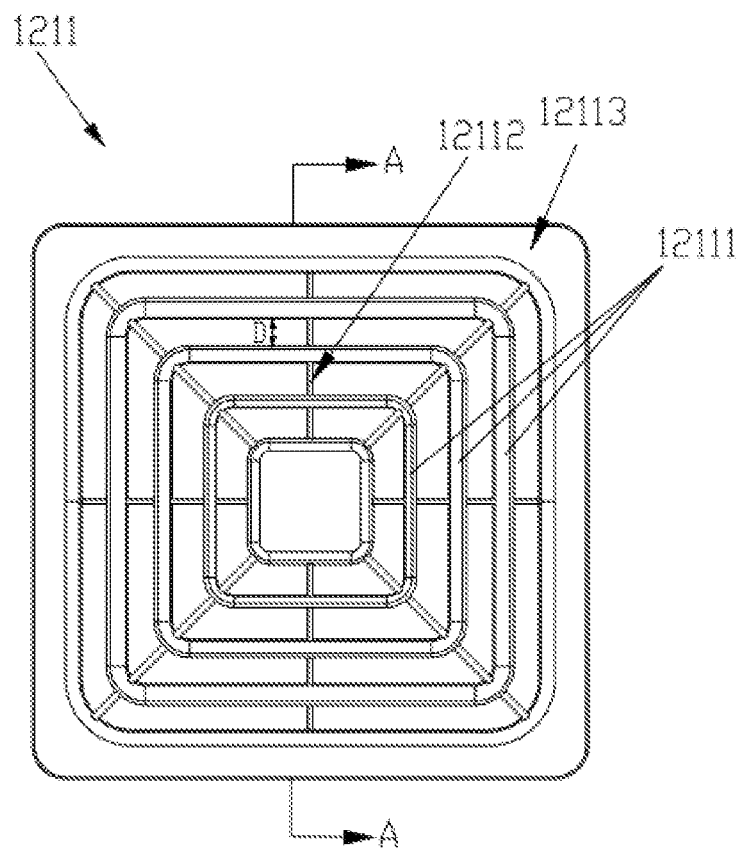
FIG. 18 is a front view illustrating the structure of an air diffusion blade according to an embodiment of the present disclosure.
Figure 19:
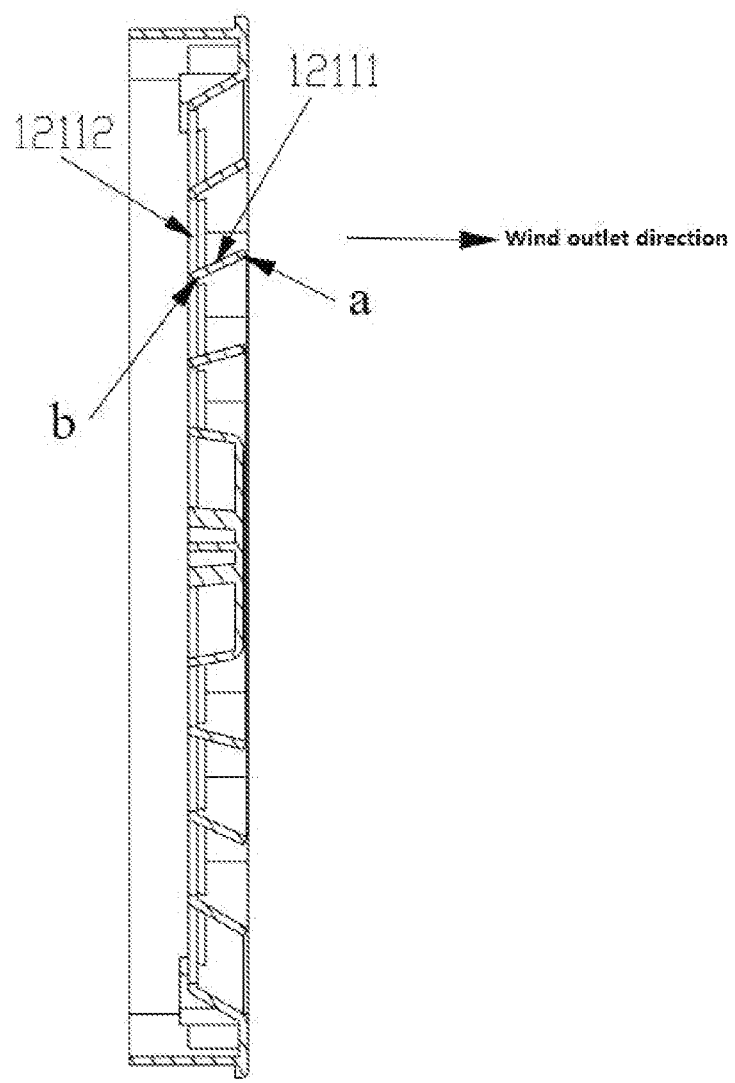
FIG. 19 is a view illustrating the structure in section A-A' of FIG. 18.

The air diffusion blade 1211 may be in any shape as long as air diffusion is implemented. In one embodiment, as shown in FIGS. 17 and 18, the air diffusion blade 1211 includes a plurality of concentric type units 12111 spreading from the center to the periphery. As shown in FIG. 19, the concentric type units 12111 are in an outwardly-spreading shape. That is, the cross-section of each concentric type unit 12111 is expanded outwardly in a bell mouth shape to implement air diffusion.

As shown in FIG. 18, a certain distance D is provided between two adjacent concentric type units 12111 to form a gap so as to facilitate the blowing. The distance D between two adjacent concentric type units 12111 may be the same as or different from the distance D between another two adjacent concentric type units 12111. In embodiments of the present disclosure, the distance between any two adjacent concentric type units 12111 is the same. That is, the concentric type units 12111 are evenly spaced to spread outwardly and form the air diffusion blade 1211.

As shown in FIGS. 17 and 18, each concentric type unit 12111 is independent. In order to relatively secure each concentric type unit 12111, the air diffusion blade 1211 further includes connection ribs 12112 configured to connect the concentric type units 12111. As shown in FIG. 18, a plurality of connection ribs 12112 may be provided and extend in the radial direction of the air diffusion blade 1211. The connection ribs 12112 are disposed on the air diffusion blade 1211 in a radiation shape. During specific molding, the entire air diffusion blade 1211 can be integrally molded by, for example, injection molding, so that the concentric type units 12111 and the connection ribs 12112 are formed together.

As shown in FIG. 19, a concentric type unit 12111 has a first end a facing the outside of the fan assembly 120 in the air outlet direction of the fan assembly 120 and a second end b facing away from the outside of the fan assembly 120. A connection rib 12112 is disposed on the second end b of the concentric type unit 12111. That is, the connection rib 12112 is provided relatively close to the inside of the concentric type unit 12111. This arrangement prevents the connection rib 12112 from interfering with the air outlet direction and affecting the airflow blown by the fan assembly 120.

As shown in FIG. 18, a concentric type unit 12111 is a closed annular unit and may be in any shape. In one example, the concentric type units 12111 are rectangular or circular. In the embodiment shown in FIG. 18, the concentric type units 12111 are rectangular.

Figure 15:
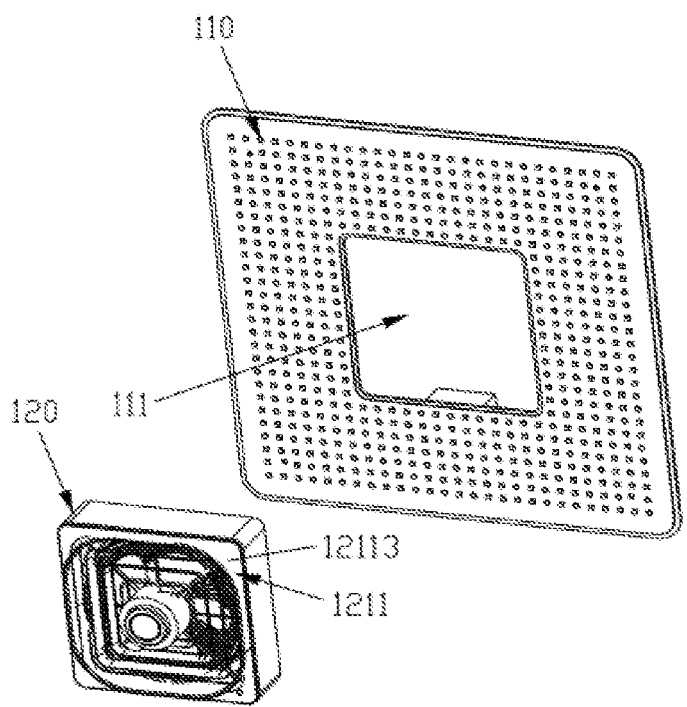
FIG. 15 is an exploded view illustrating the structure shown in FIG. 13 according to the present disclosure.
Figure 16:
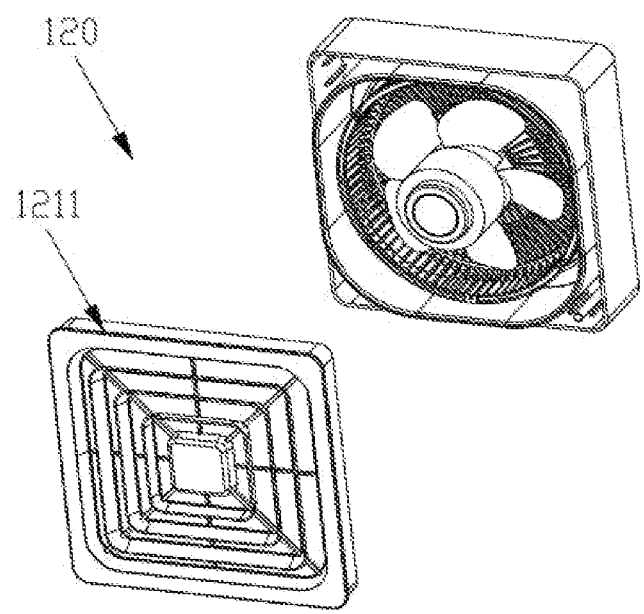
FIG. 16 is an exploded view illustrating the structure of a fan assembly according to an embodiment of the present disclosure.

Referring to FIG. 15, the center of the lamp board assembly 110 is provided with the mounting hole 111 to install the fan assembly 120. The fan assembly 120 is mounted in the mounting hole 111. The mounting hole 111 is a through hole. The arrangement in which the lamp board assembly 110 is provided with the mounting hole 111 to install the fan assembly 120 can save material. The lamp board assembly 110 is hollowed out to install the fan assembly 120, saving the material of the lamp board assembly 110. Moreover, the arrangement in which the fan assembly 120 is mounted in the mounting hole 111 helps reduce the thickness of the entire fan grow light 100 and facilitates the positioning and installation of the fan assembly 120. The shape of the mounting hole 111 is consistent with the shape of the fan assembly 120 so that the fan assembly 120 can be positioned by using the mounting hole 111. In general, the fan assembly 120 is rectangular. Accordingly, the mounting hole 111 is also rectangular.

Figure 13:
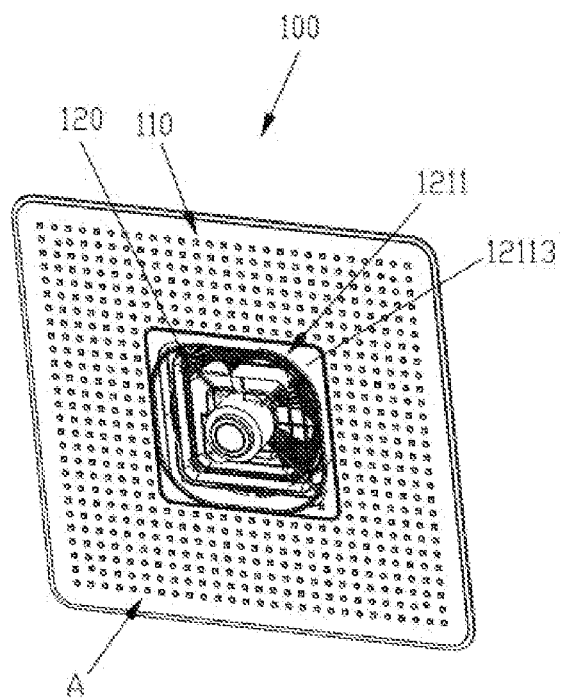
FIG. 13 is a view illustrating the structure of a fan grow light according to a seventh embodiment of the present disclosure.

In one embodiment, referring to FIGS. 13, 15 and 18, the edge of the air diffusion blade 1211 is provided with a rib 12113 that is able to enclose the mounting hole 111, avoiding air leakage and improving the aesthetics of the overall appearance.

Figure 14:
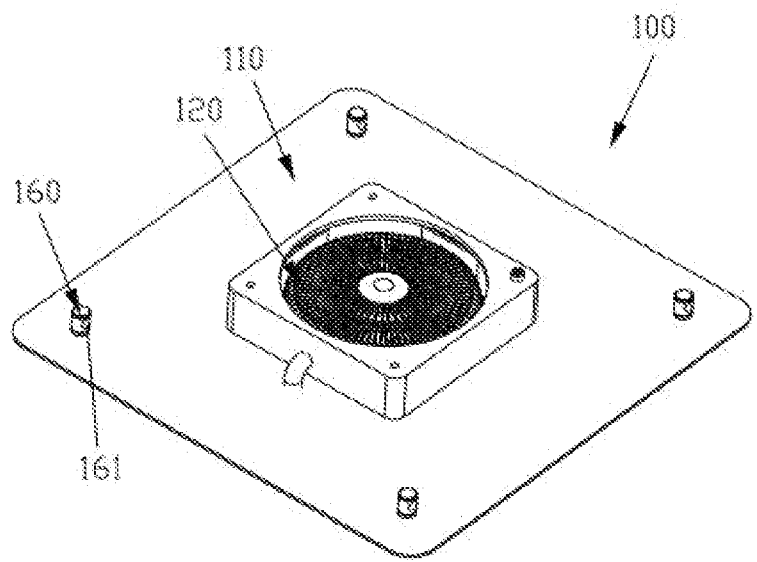
FIG. 14 is a view illustrating the structure shown in FIG. 13 and taken from another perspective.
Figure 20:
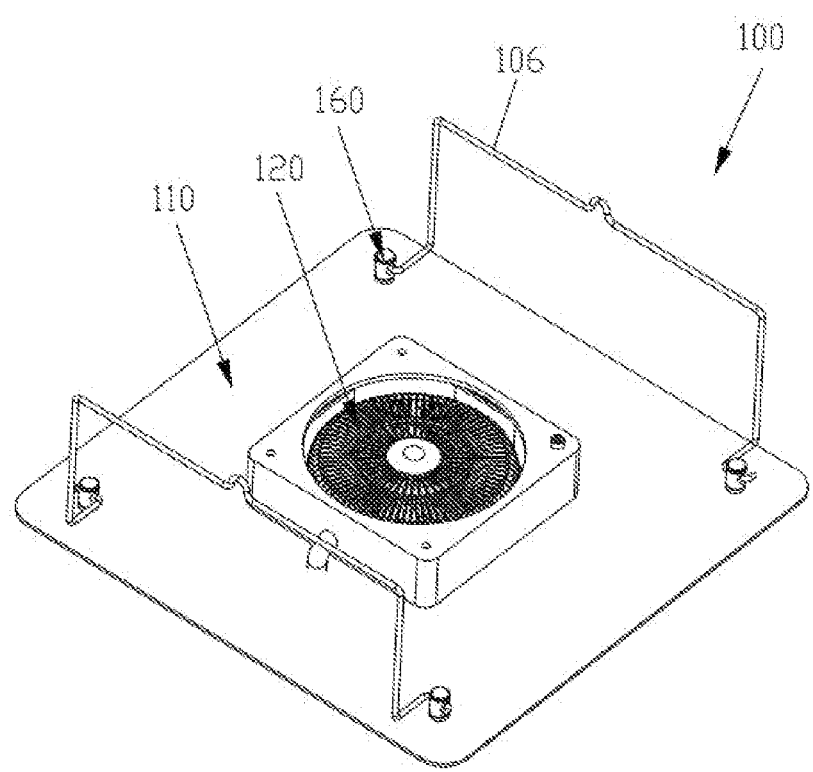
FIG. 20 is a view illustrating the structure of a fan grow light according to another embodiment of the present disclosure.

Referring to FIGS. 14 and 20, a plurality of suspension structures 160 are disposed in the circumferential direction of the lamp board assembly 110 to suspend the air diffusion fan grow light 100. As shown in FIG. 20, each suspension structure 160 is connected to a hanging rope or a hanging rod 106. Then the hanging rope or the hanging rod 106 is secured to the tent 101 so that the fan grow light 100 is mounted in the tent 101.

A suspension structure 160 may be a structure including a suspension hook, a suspension hole, or a suspension post as long as the suspension is implemented, which is not limited here.

In one embodiment, as shown in FIGS. 14 and 20, a suspension structure 160 is a suspension post. The suspension post is provided with a hanging hole 161. As shown in FIG. 20, to suspend the fan grow light 100, a hanging rope or a hanging rod 106 is made to pass through the hanging hole 161 and is secured in the tent 101. For example, the suspension post is connected to the lamp board assembly 110 through a screw so that the suspension post is secured to the fan grow light 100.

In the embodiments of the present disclosure, the fan assembly of the fan grow light includes the air diffusion blade. The air diffusion blade can expand the outlet angle of the airflow blown by the fan assembly, thereby implementing 360-degree air diffusion and improving the effect of air circulation in the tent.

The preceding embodiments of the present disclosure are merely illustrative examples of the present disclosure and are not intended to limit implementations of the present disclosure. Those of ordinary skill in the art can make various apparent modifications, adaptations and substitutions without departing from the scope of the present disclosure. Implementations of the present disclosure cannot be and do not need to be all exhausted herein. Any modifications, equivalent substitutions, and improvements made within the concept of the present disclosure fall within the scope of the claims of the present disclosure.

What is claimed is:

1. A fan grow light, wherein the fan grow light is configured to be mounted in a tent, the fan grow light comprises a lamp board assembly and a fan assembly disposed on the lamp board assembly, and the fan assembly is able to promote air circulation in the tent,
   wherein the fan assembly comprises an air diffusion blade disposed on an air outlet surface of the fan assembly so as to expand an air outlet angle of an airflow blown by the fan assembly,
   wherein the air diffusion blade comprises a plurality of concentric type units spreading from a center to a periphery, and the plurality of concentric type units are in an outwardly-spreading shape, and
   wherein a cross-section of each concentric type unit is expanded outwardly in a bell mouth shape to implement air diffusion.

2. The fan grow light according to claim 1, wherein the lamp board assembly is provided with a mounting hole, and the fan assembly is disposed in the mounting hole.

3. The fan grow light according to claim 1, wherein the fan assembly is hinged to the lamp board assembly so that the fan assembly is rotatable on the lamp board assembly.

4. The fan grow light according to claim 1, further comprising:
   a first servo disposed on the lamp board assembly, wherein the fan assembly is connected to an output end of the first servo so that the first servo drives the fan assembly to rotate.

5. The fan grow light according to claim 4, wherein the first servo is disposed on one end of the fan assembly, and another end of the fan assembly is hinged to the lamp board assembly through a hinge shaft.

6. The fan grow light according to claim 4, further comprising:
   a second servo, wherein the fan assembly comprises a fan assembly main body and a fan assembly connection piece; the fan assembly connection piece is connected to the output end of the first servo so that the first servo drives the fan assembly connection piece to rotate around a first axis; the second servo is disposed on the fan assembly connection piece and an output end of the second servo is connected to the fan assembly main body so that the second servo drives the fan assembly main body to rotate around a second axis; and the second axis is perpendicular to the first axis.

7. The fan grow light according to claim 6, wherein the fan assembly connection piece is in a shape of a rectangular frame and comprises a first side, a second side, a third side and a fourth side that are successively connected to each other; the fan assembly main body is disposed in the fan assembly connection piece; the first side of the fan assembly connection piece is connected to the first servo; and the second side of the fan assembly connection piece is provided with the second servo.

8. The fan grow light according to claim 1, further comprising:
   a hinge holder disposed on the lamp board assembly, wherein a top end of the hinge holder is connected to the lamp board assembly, and the fan assembly is hinged to a bottom end of the hinge holder.

9. The fan grow light according to claim 8, wherein the hinge holder comprises:
   an installation plate connected to the lamp board assembly; and
   a hinge arm which extends from the installation plate in a direction away from the installation plate, wherein the fan assembly is hinged to the hinge arms.

10. The fan grow light according to claim 9, wherein two hinge arms are provided, and the two hinge arms are disposed opposite to each other and are hinged to two ends of the fan assembly respectively.

11. The fan grow light according to claim 1, wherein the fan assembly comprises a cross-flow fan, an air guide piece and a servo; the air guide piece is disposed on an air outlet surface of the cross-flow fan and is connected to the servo; and the servo is able to drive the air guide piece to rotate around an axis parallel to an axial direction of the cross-flow fan.

12. The fan grow light according to claim 1, wherein a plurality of suspension structures are disposed in a circumferential direction of the lamp board assembly, and each of the plurality of suspension structures is configured to connect a hanging rope or a hanging rod.

13. The fan grow light according to claim 1, wherein a front side of the fan assembly is provided with protective rotating blades rotating coaxially with a main blade of the fan assembly.

14. The fan grow light according to claim 1, wherein a plurality of fan assemblies are provided, and the plurality of fan assemblies are disposed in a circumferential direction of the lamp board assembly.

15. The fan grow light according to claim 1, further comprising:
    a housing disposed on the lamp board assembly;
    a heat dissipation piece disposed in the housing; and
    an inserting assembly disposed on the housing and configured to be connected to a controller or a power supply.

16. The fan grow light according to claim 1, wherein the plurality of concentric type units are rectangular or circular.

17. The fan grow light according to claim 1, wherein the air diffusion blade further comprises at least one connection rib configured to extend in a radial direction of the air diffusion blade and connect the plurality of concentric type units.

18. The fan grow light according to claim 1, wherein a center of the lamp board assembly is provided with a mounting hole, the fan assembly is disposed in the mounting hole, and an edge of the air diffusion blade is provided with a rib that is able to close the mounting hole.

\* \* \* \* \*